July 23, 1940.  H. D. MacDONALD  2,209,030
WHEEL
Filed Sept. 30, 1938
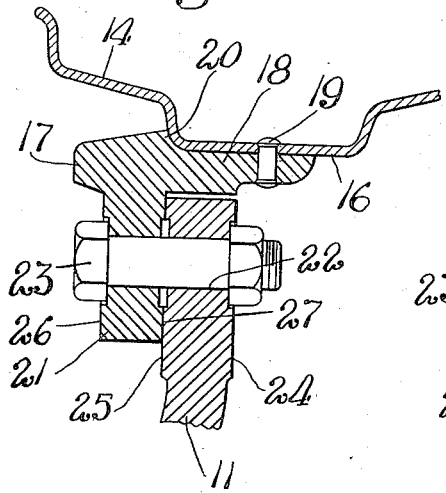
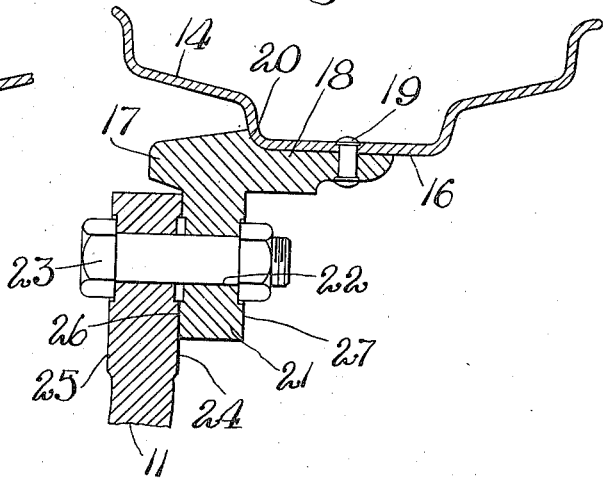
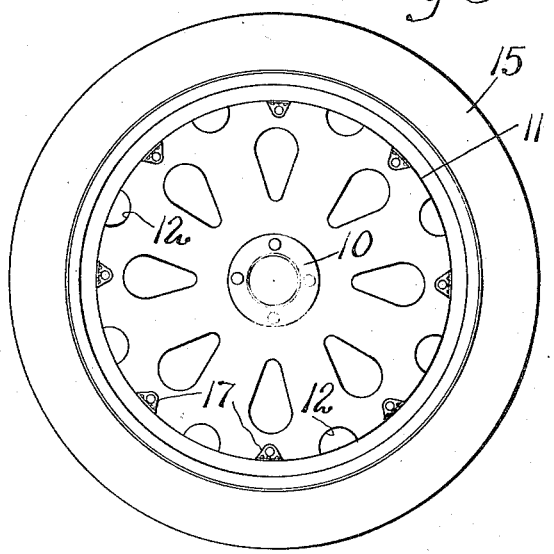
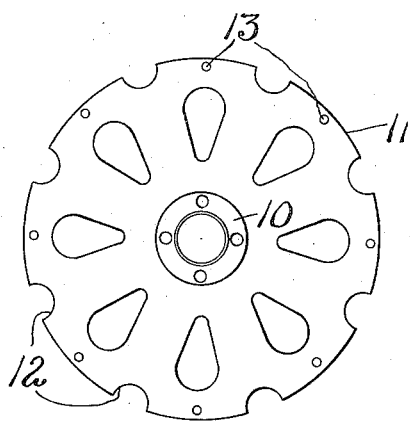
Inventor
Howard D. MacDonald
By V. F. Lasagne
Atty.

Patented July 23, 1940

2,209,030

UNITED STATES PATENT OFFICE 2,209,030

WHEEL

Howard D. MacDonald, La Grange, Ill., assignor to International Harvester Company, a corporation of New Jersey Application September 30, 1938, Serial No. 232,625

1 Claim. (Cl. 301—11)

This invention relates to a wheel, and more particularly to a rim and wheel assembly in which the rim may be disposed on the wheel in a plurality of positions axially offset with respect to the wheel.

Various types of wheel assemblies have been provided in which the rim is adapted to be mounted on the wheel in a plurality of different positions. The largest field for the use of such wheel constructions is that including tractors and agricultural implements. The purpose of providing such wheel constructions is for varying the tread of the vehicle on which the wheels are used, and for this reason the wheels are spoken of as variable tread wheels. To further increase the number of positions in which a rim may be mounted, most wheels are formed with the planes of their peripheries axially spaced from a plane passed through the center of the hub. In this manner, a wheel may be reversed on the axle, thus doubling the number of positions in which a rim may be mounted. In most practical wheel and rim assemblies, eight positions for the rim have been successfully achieved as far as construction and adaptability of parts are concerned. One of the greatest disadvantages yet remaining in the art of variable tread wheels is that presented by the difficulty in easily and quickly changing the rims from one position to another. There often times is necessitated considerable time and labor in effecting such changes, since the entire wheel assembly must be removed in the event that the rim is mounted at the inboard face of the wheel. In some instances, this problem is solved by the provision of a plurality of separate lugs, which may be individually removed from the wheel. The adoption of this means, however, entails the handling of a considerable number of small parts which are apt to become misplaced or easily damaged.

The present invention contemplates and has for its principal object the provision of a wheel and rim assembly of the variable tread type in which the difficulties and problems mentioned above are eliminated.

An important object of the invention is the provision of a wheel having its periphery so formed at certain points as to permit the rim to be moved axially from one position to another.

Another object of the invention is to provide a wheel and rim assembly in which rim-supporting and wheel-engaging lugs are rigidly carried by the rim.

Another object is to provide notches or cut-out portions in the wheel, as aforesaid, for the purpose of accommodating these lugs when the position of the rim is changed.

And, still another object is to provide the notches of a sufficient size to accommodate the lugs and yet small enough to retain a substantially continuous periphery on the wheel, which provision permits rolling of the wheel without the rim or tire mounted thereon.

Briefly and specifically, these and other desirable objects are achieved in one preferred form of wheel and rim assembly in which the periphery of the wheel is formed with a plurality of circumferentially spaced, radially inwardly extending notches. The rim, which is adapted to be mounted on the wheel rigidly, carries thereon a plurality of circumferentially spaced rim-supporting lugs, the spacing and number of the lugs corresponding to the spacing and number of the notches in the wheel. When the rim is mounted on the wheel, the lugs are secured to portions of the wheel between the notches. When it is desired to change the position of the rim with respect to the wheel, the securing means for the lugs are removed and the rim is moved angularly until the lugs are respectively alined with the notches. The rim is then shifted axially of the wheel, the lugs passing through the notches; the rim is then moved angularly again and secured at the other side of the wheel to the wheel portions between the notches. A number of other positions for the rim may be similarly obtained.

A more complete understanding of the desirable features and operation of the invention may be had from the following detailed description taken in conjunction with the accompanying sheet of drawings, in which:

Figure 1 is a transverse sectional view, showing the relation between a portion of the wheel periphery, the rim and the rim-supporting lug in one position;

Figure 2 is a similar view, showing the rim in another position;

Figure 3 is a reduced face view of the wheel with the rim and a tire mounted thereon; and, Figure 4 is a face view of the wheel with its rim and tire removed.

The particular wheel chosen for the purposes of illustration is circular and includes a central hub portion 10 and an outer periphery 11 which is formed with a plurality of circumferentially spaced, radially inwardly extending notches or cut-out portions 12. As best shown in Figures 3 and 4, these notches are comparatively small. The peripheral wheel portions between the notches are provided respectively with bores or openings 13 for mounting a rim on the wheel, as will appear later. In the present instance, the wheel is formed in a manner in which the plane of the periphery is axially spaced or offset with respect to a parallel plane passed through the hub, the wheel being of the type commonly termed dished.

A rim 14 is adapted to be carried by or mounted on the wheel, and in the present instance is shown as that type adapted to carry a pneumatic tire 15. The rim 14 is of the semi-drop-center type having a center well 16 which is utilized for the purpose of carrying a plurality of circumferentially spaced rim-supporting lugs 17. Each lug is formed with a rim-supporting portion 18, which is secured to the center well 16 of the rim by a plurality of securing means in the form of rivets or the like, as at 19. To further strengthen the mounting of the lugs on the rim, an integral portion of the lug engages a portion of the outer side of the well 16, as at 20. Each lug 17 is further formed with a wheel-engaging portion 21, which extends radially inwardly from the rim from a point on the rim axially offset with respect to its center. Each lug is formed with a bore or opening 22. When the rim is mounted on the wheel, bolts 23 are passed through the openings 22 in the lugs 17 and through the openings 13 in the wheel.

Figure 1 shows the rim mounted in one position on the wheel and suitable faces 24 and 25 have been provided on opposite sides of the wheel to receive faces 26 and 27 formed at opposite sides of the wheel-engaging portion 21 of a lug 17. It will be understood, of course, that any of various types of lug receiving pockets or the like may be provided as desired.

The spacing of the lugs 17 on the rim 14 is equal to the spacing of the notches 12 in the periphery of the wheel. The number of lugs is equal in the present instance to the number of notches, although there may be fewer lugs if desired.

A thorough understanding of the manner in which the rim may be changed from one position to another may be had from an examination of Figures 3 and 4. It will be seen from these figures that in order to move the rim from one side of the wheel to the other, the bolts 23 are first removed, after which the rim is moved angularly with respect to the wheel until the lugs 17 become alined with the notches 12; the rim and tire are then shifted axially with respect to the wheel from one side thereof to the other, the wheel-engaging portions 21 of the lugs 17 passing through the notches 12; the rim is then moved angularly with respect to the wheel until the holes 22 and 13 of the lugs and wheel, respectively, are alined. The bolts 23 are replaced and the rim is secured to the wheel in a second position.

A further understanding of the manner in which numerous other rim positions may be similarly obtained may be had from an examination of Figures 1 and 2. Figure 2 shows a rim position in which the rim has been moved axially of the wheel and has been secured thereto on its opposite side; that is, the faces 26 of the wheel-engaging portions 21 of the lugs 17 now engage the faces 25 of the wheel. Looking again to Figure 1, it will be seen that, by removing the bolts 23, the rim may be reversed and secured to the wheel in a third position. In this third position, the faces 26 of the wheel-engaging portions 21 of the lugs 17 engage the faces 24 of the wheel. Looking now to Figure 2, it will be seen that still another position may be obtained. The bolts 23 are removed and the rim is reversed so that the faces 27 on the wheel-engaging portions of the lugs engage the faces 25 of the wheel. This fourth position is substantially a reversal of the first position, as shown in Figure 1. The third position is substantially a reversal of the second position. Since the wheel is dished, as aforesaid, the number of positions may be doubled by removing the entire wheel on the axle of the vehicle and reversing and replacing the same.

It will be noted that the notches 12 are sufficiently large to permit free and easy movement of the lugs 17 therethrough as the rim is changed from one position to another. These notches are small enough, however, to retain a substantially unbroken peripheral edge on the wheel so that the vehicle on which the wheels are used may be transported or otherwise moved about without tires and rims.

From the foregoing description, it will be seen that a novel rim and wheel assembly has been provided in which the rim may be easily and quickly changed from one position to another with respect to the wheel and that the wheel is further capable of utility without a tire and rim. It will be appreciated, of course, that only a preferred embodiment of the invention has been shown and illustrated and that numerous modifications and alterations may be made in the construction without departing from the spirit and scope of the invention as defined in the appended claims.

What is claimed is:

A wheel and rim assembly comprising a tire-carrying rim having a plurality of lugs secured thereto in circumferentially spaced relation and extending radially inwardly from the inner periphery of the rim, each lug having a wheel-mounting portion axially off-set from the median plane of the rim, said portions being alined in a plane parallel to said median plane, and a wheel having opposite faces to either of which the lugs may be secured and further having a substantially continuous periphery formed with small notches open to the periphery and circumferentially spaced in accordance with the positions of the lugs on the rim, the wheel portions between the notches providing lug-mounting portions for mounting the rim on the wheel, each notch having peripheral extent considerable less than the peripheral extent of a lug-mounting portion, whereby the radial distance between the chord across a notch and the subtended arc is comparatively slight, each notch being of a size slightly larger than a lug, the notches being thereby adapted to accommodate the lugs as the lugs are passed therethrough to transfer the rim from one face of the wheel to the other.

HOWARD D. MacDONALD.